US012783001B2

(12) United States Patent
Zhu

(10) Patent No.: US 12,783,001 B2
(45) Date of Patent: Nov. 3, 2026

(54) SYSTEM-ON-CHIP-BASED TIME SYNCHRONIZATION METHOD, SYSTEM AND STORAGE MEDIUM

(71) Applicant: BEIJING HORIZON INFORMATION TECHNOLOGY CO., LTD., Beijing (CN)

(72) Inventor: Jiahua Zhu, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 82 days.

(21) Appl. No.: 19/038,080

(22) Filed: Jan. 27, 2025

(65) Prior Publication Data

US 2025/0172964 A1 May 29, 2025

(30) Foreign Application Priority Data

Feb. 1, 2024 (CN) ......................... 202410146009.7

(51) Int. Cl.
*G06F 1/12* (2006.01)
*G06F 15/78* (2006.01)

(52) U.S. Cl.
CPC ............ *G06F 1/12* (2013.01); *G06F 15/7814* (2013.01)

(58) Field of Classification Search
CPC ........................................................ G06F 1/12
See application file for complete search history.

(56) References Cited

U.S. PATENT DOCUMENTS 6,633,753 B1 * 10/2003 Kido ................ H04W 52/0229 455/574
6,789,182 B1 * 9/2004 Brothers ............ H04L 43/0811 714/39
2003/0058893 A1 * 3/2003 Dworkin .................. H04J 3/14 370/503
2010/0058101 A1 3/2010 Shahid et al.
(Continued)

FOREIGN PATENT DOCUMENTS

CN 117270630 A 12/2023

OTHER PUBLICATIONS

Extended European search report from the corresponding European Patent Application No. 25155389.7, mailed on Jun. 20, 2025.

*Primary Examiner* — Phil K Nguyen
(74) *Attorney, Agent, or Firm* — K&L Gates LLP

(57) ABSTRACT

Disclosed are system-on-chip-based time synchronization method, a system, and a storage medium. The method includes: determining a synchronization time value for a synchronization clock source to send a pulse signal to a network controller and an interrupt controller of the system-on-chip, and a first time value when the interrupt controller and the network controller receive the pulse signal; determining that the interrupt controller triggers an interrupt of a central processing unit of the system-on-chip in respond to the pulse signal; determining a second time value of the network controller at an interrupt response moment, and a first system time value of the system-on-chip at the interrupt response moment; and performing time synchronization on the system-on-chip based on the synchronization time value, the first time value, the second time value, and the first system time value. According to this disclosure, a problem of large time synchronization errors can be avoided.

20 Claims, 10 Drawing Sheets

(56) References Cited

U.S. PATENT DOCUMENTS

| | | | | |
|---|---|---|---|---|
| 2013/0275114 | A1* | 10/2013 | Morishima | G06F 9/455<br>703/26 |
| 2014/0143582 | A1* | 5/2014 | Kindred | H04W 56/005<br>713/400 |
| 2019/0379475 | A1* | 12/2019 | Seethamraju | H04J 3/0667 |
| 2021/0058223 | A1* | 2/2021 | Sakuma | G06F 1/14 |
| 2024/0120928 | A1* | 4/2024 | Kuo | H03L 7/099 |

* cited by examiner

SYSTEM-ON-CHIP-BASED TIME SYNCHRONIZATION METHOD, SYSTEM AND STORAGE MEDIUM

CROSS-REFERENCE TO RELATED APPLICATIONS

The present application claims priority to Chinese Patent Application No. 202410146009.7, entitled "SYSTEM-ON-CHIP-BASED TIME SYNCHRONIZATION METHOD, SYSTEM, APPARATUS, AND STORAGE MEDIUM", filed with the China National Intellectual Property Administration on Feb. 1, 2024, the content of which is hereby incorporated by reference in its entirety.

FIELD OF THE INVENTION

This disclosure relates to the field of global positioning system (GPS) time synchronization, and in particularly, to a system-on-chip-based time synchronization method, a system, an apparatus, and a storage medium.

BACKGROUND OF THE INVENTION

In an intelligent driving system, reference time of various in-vehicle sensors is generally unified through GPS time synchronization. Therefore, accuracy and reliability of the GPS time synchronization are crucial for safety of intelligent driving.

At present, the intelligent driving system (for example, an assisted driving system or an automated driving system) has large data throughput, and a lot of computational power of a central processing unit (CPU) is consumed. As a result, an interrupt response latency is greater than 6 milliseconds (ms). Moreover, the accuracy and the reliability of the GPS time synchronization are affected by the interrupt response latency. Therefore, the GPS time synchronization has relatively large and unstable errors, and thus cannot meet safety requirements for intelligent driving.

SUMMARY OF THE INVENTION

Usually, due to impact of an interrupt response latency, GPS time synchronization has relatively large and unstable errors, and thus cannot meet safety requirements for intelligent driving.

To resolve the foregoing technical problem, this disclose provide a system-on-chip-based time synchronization method, including:

- determining a synchronization time value for a synchronization clock source to send a pulse signal to a network controller and an interrupt controller of the system-on-chip, and a first time value when the interrupt controller and the network controller receive the pulse signal;
- determining that the interrupt controller triggers an interrupt of a central processing unit of the system-on-chip in respond to the pulse signal;
- determining a second time value of the network controller at an interrupt response moment, and a first system time value of the system-on-chip at the interrupt response moment; and
- performing time synchronization on the system-on-chip based on the synchronization time value, the first time value, the second time value, and the first system time value.

According to a second aspect of this disclose, a system-on-chip is provided, including:

- a transceiver interface, configured to receive a synchronization time value sent from a synchronization clock source;
- a network controller, configured to receive and respond to a pulse signal sent from the synchronization clock source, and determine a first time value when receiving the pulse signal; and
- an interrupt controller, configured to receive and respond to the pulse signal sent from the synchronization clock source, and trigger an interrupt of a central processing unit,
- wherein the central processing unit is coupled to the network controller, the interrupt controller, and the transceiver interface, and is configured to obtain the synchronization time value and the first time value; determine, in response to the interrupt of the central processing unit, a second time value of the network controller at an interrupt response moment, and a first system time value of the system-on-chip at the interrupt response moment; and perform time synchronization on the system-on-chip based on the synchronization time value, the first time value, the second time value, and the first system time value.

An embodiment of a third aspect of this disclosure provides a system-on-chip-based time synchronization apparatus, including:

- a first determining module, configured to determine a synchronization time value for a synchronization clock source to send a pulse signal to a network controller and an interrupt controller of the system-on-chip, and a first time value when the interrupt controller and the network controller receive the pulse signal;
- a second determining module, configured to determine that the interrupt controller triggers an interrupt of a central processing unit of the system-on-chip in respond to the pulse signal;
- a third determining module, configured to determine a second time value of the network controller at an interrupt response moment, and a first system time value of the system-on-chip at the interrupt response moment; and
- a synchronization module, configured to perform time synchronization on the system-on-chip based on the synchronization time value, the first time value, the second time value, and the first system time value.

An embodiment of a fourth aspect of this disclosure provides a computer readable storage medium. The storage medium stores a computer program, and the computer program is used for implementing the system-on-chip-based time synchronization method according to the first aspect.

In the embodiments of this disclosure, an interrupt response latency can be accurately obtained by determining the first time value when the interrupt controller and the network controller receive the pulse signal and the second time value of the network controller at the interrupt response moment. Thus, the system time value when the system-on-chip receives the pulse signal can be accurately determined based on the first time value when the interrupt controller and the network controller receive the pulse signal, the second time value of the network controller at the interrupt response moment, and the first system time value of the system-on-chip at the interrupt response moment. In this way, time synchronization can be accurately performed on the system-on-chip based on the system time value when the system-on-chip receives the pulse signal and the synchronization time value for the synchronization clock source to send the pulse signal to the network controller and the interrupt controller. Thus, a problem of large time synchronization errors caused by interrupt response latencys is avoided, so as to improve accuracy and reliability of time synchronization, thereby improving safety of intelligent driving.

DETAILED DESCRIPTION OF THE EMBODIMENTS

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Application Overview

In an intelligent driving system, it is needed to plan a driving path for a vehicle based on raw data captured by various in-vehicle sensors, and control a motor or a hydraulic actuator on the vehicle to perform corresponding actions. Therefore, it is needed to provide same reference time for the various in-vehicle sensors.

Currently, the reference time of the various in-vehicle sensors is mainly unified through GPS time synchronization. To be specific, a high-precision clock signal is mainly obtained from a satellite through a GPS, and is used as a clock source for a system-on-chip to provide unified reference time to the various in-vehicle sensors. Therefore, accuracy and reliability of the GPS time synchronization are crucial for safety of intelligent driving.

Figure 1:
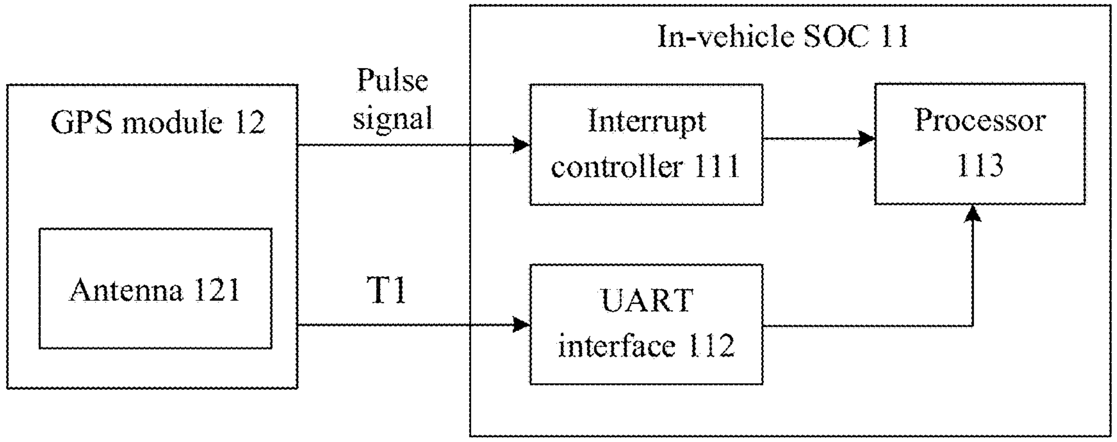
FIG. 1 is a schematic diagram of a scheme of synchronizing GPS satellite time to local system time of an in-vehicle system-on-chip (SOC) according to an exemplary embodiment of this disclosure.

FIG. 1 is a schematic diagram of a scheme of synchronizing GPS satellite time to local system time of an in-vehicle SOC according to an exemplary embodiment of this disclosure. As shown in FIG. 1, an in-vehicle SOC 11 includes an interrupt controller 111, a UART interface 112, and a processor 113 (for example, a central processing unit 113). A GPS module 12 includes an antenna 121. A first output end of the GPS module 12 is coupled to an input end of the interrupt controller 111 for sending a pulse signal to the interrupt controller 111. An output end of the interrupt controller 111 is coupled to the processor 113 for receiving the pulse signal, and generating and outputting an interrupt request to the processor 113 based on the pulse signal. The UART interface 112 is coupled between a second output end of the GPS module 12 and the processor 113, to receive satellite time T1 when the GPS module 12 sends the pulse signal, and output the satellite time T1 to the processor 113.

A GPS time synchronization process is exemplarily described below with reference to FIG. 1.

As shown in FIG. 1, the GPS module 12 first obtains a high-precision satellite clock signal (satellite time) in a real-time manner through the antenna 121, sends a pulse signal to the interrupt controller 111 every 1 s (second), and meanwhile, sends the satellite time T1 obtained by the GPS module 12 at a current moment to the UART interface 112. Subsequently, the interrupt controller 111 receives the pulse signal, and sends the interrupt request to the processor 113 in respond to the pulse signal. Subsequently, in response to the interrupt request, the processor 113 reads a system time value Sys_time of the in-vehicle SOC 12 from an interrupt service program, and calculates a difference between the Sys_time and the T1. Finally, system time of the in-vehicle SOC 12 is corrected based on the difference between the Sys_time and the T1, thereby implementing GPS time synchronization.

Description is made by using an example in which an operating system carried by the in-vehicle SOC 12 is a non-real-time operating system. In the foregoing GPS time synchronization process, the processor 113 may respond to the interrupt request after a latency of some time (an interrupt latency), and read the system time value Sys_time of the in-vehicle SOC 12 from the interrupt service program.

In other words, the Sys_time is a system time value read after a latency of some time after the pulse signal is received, rather than a system time value when the pulse signal is received. Therefore, the Sys_time and the T1 are not timestamps at a same moment. Further, an error in the GPS time synchronization performed based on the difference between the Sys_time and the T1 is affected by an interrupt response latency, and is directly proportional to the interrupt response latency. A larger interrupt response latency indicates a greater error in the GPS time synchronization, while a smaller interrupt response latency indicates a smaller error in the GPS time synchronization.

However, during operation, the intelligent driving system needs to obtain a large amount of sensor signals (such as a multi-channel camera signal, a laser radar signal, a millimeter-wave radar signal, and an inertial navigation signal), so as to process the sensor signals through an artificial intelligence algorithm and plan a driving path for a vehicle. System interrupts (corresponding to CPU interrupts) may be frequently generated in the process of obtaining the large amount of sensor signals, and the artificial intelligence algorithm may consume a lot of CPU computational power. As a result, the CPU is in a busy state for a long time, which affects the interrupt response latency of the CPU. Thus, the interrupt response latency of the CPU is not only large but also has significant jitter. Further, the error in the GPS time synchronization is relatively large and is unstable.

Currently, even when load of the intelligent driving system is relatively small, the interrupt response latency of the CPU is also greater than 6 ms. Therefore, the error in the GPS time synchronization is extremely large, and it is difficult to achieve stable convergence in a time synchronization process. If the satellite time obtained by the GPS module is indirectly synchronized to all the in-vehicle sensors through a precision time protocol (PTP) according to the GPS time synchronization manner shown in FIG. 1, the sensor signals sent by the in-vehicle sensors may have a risk of time-hopping and even time regression, which ultimately leads to significant safety hazards to perception and decision-making of the intelligent driving system, and thus cannot meet safety requirements for intelligent driving.

Therefore, it is urgently required to optimize a GPS time synchronization scheme shown in FIG. 1, so as to improve accuracy and reliability of the GPS time synchronization.

In some examples, the interrupt response latency may be reduced by raising a priority of the CPU in processing the interrupt request triggered by the pulse signal, so as to resolve an extremely large error in the GPS time synchronization due to an extremely large interrupt response latency. However, a priority in an in-vehicle SOC has been forcibly assigned to a strong safety related thread. If the priority, generated by high frequency, of the CPU in processing the interrupt request triggered by the pulse signal is raised, the priority of the strong safety related thread may be lowered. Thus, safety of the entire vehicle is reduced. Meanwhile, although the priority, generated by high frequency, of the CPU in processing the interrupt request triggered by the pulse signal is raised, and the error in the GPS time synchronization is reduced, jitter still obviously exists in the interrupt response latency, and there are still significant safety hazards in the perception and decision-making of intelligent driving system.

Exemplary System

Figure 2:
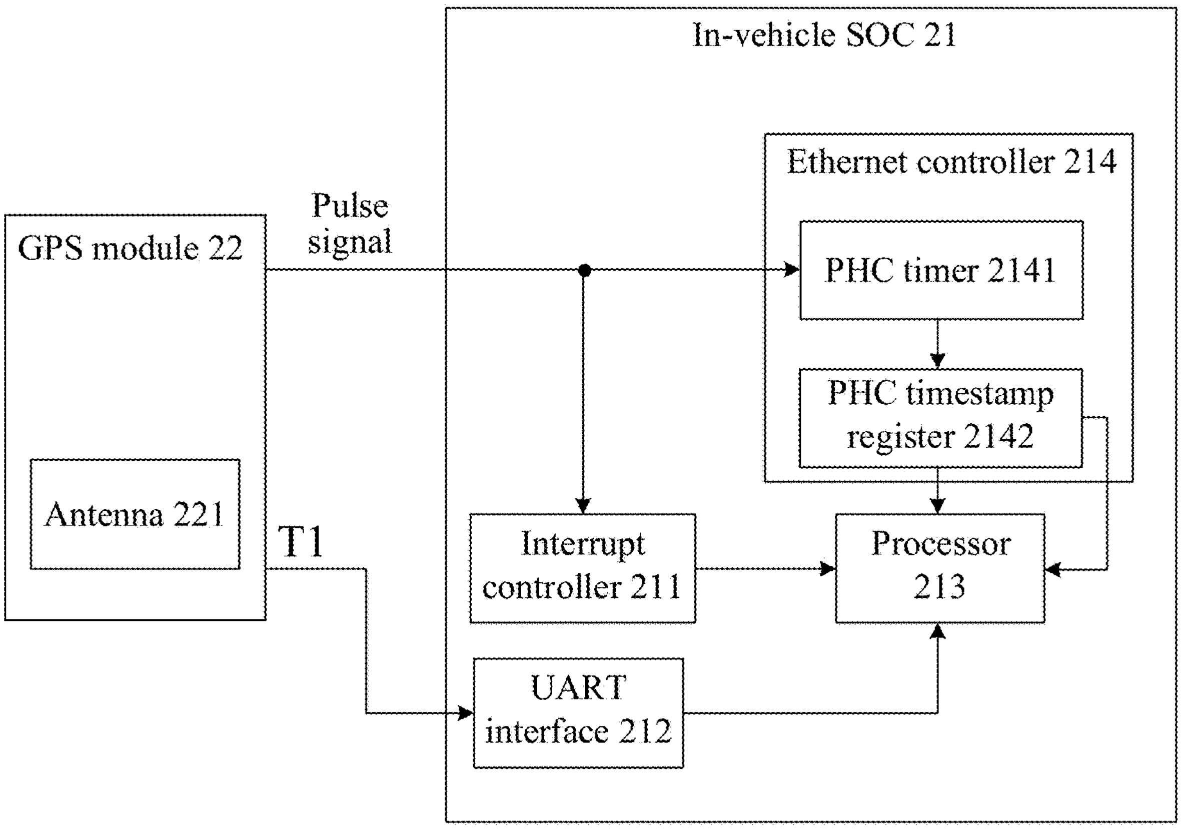
FIG. 2 is a schematic diagram of another scheme of synchronizing GPS satellite time to local system time of an in-vehicle SOC according to an exemplary embodiment of this disclosure.

FIG. 2 is a schematic diagram of another scheme of synchronizing GPS satellite time to local system time of an in-vehicle SOC according to an exemplary embodiment of this disclosure. As shown in FIG. 2, an in-vehicle SOC 21 includes an interrupt controller 211, a UART interface 212, a processor 213, and an Ethernet controller 214. The Ethernet controller 214 includes a network port clock (PTP hardware clock, PHC) timer 2141 and a PHC timestamp register 2142. A GPS module 22 includes an antenna 221. A first output end of the GPS module 22 is simultaneously coupled to an input end of the interrupt controller 211 and the PHC timer 2141, for sending a pulse signal to the interrupt controller 211 and the PHC timer 2141 at the same time. An output end of the interrupt controller 211 is coupled to the processor 213 for receiving the pulse signal, and generating and outputting an interrupt request to the processor 213 based on the pulse signal. The PHC timer 2141 is coupled to the PHC timestamp register 2142 to receive the pulse signal, and store, at a rising edge of the pulse signal, a count value c1 on the PHC timer 2141 into the PHC timestamp register 2142. The processor 213 is coupled to both the PHC timestamp register 2142 and the PHC timer 2141, to obtain the count value c1 stored on the PHC timestamp register 2142 and a count value c2 on the PHC timer 2141 at an interrupt response moment, and to calculate a response latency based on the c1 and the c2. The UART interface 212 is coupled between a second output end of the GPS module 22 and the processor 213, to receive satellite time T1 when the GPS module 22 sends the pulse signal, and output the satellite time T1 to the processor 213.

A GPS time synchronization process is exemplarily described below with reference to FIG. 2.

As shown in FIG. 2, the GPS module 22 first obtains a high-precision satellite clock signal in a real-time manner through the antenna 221, sends a pulse signal to the interrupt controller 211 and the PHC timer 2141 every preset time (such as 1 second), and meanwhile, sends the satellite time T1 obtained by the GPS module 22 at a current moment to the UART interface 212.

Subsequently, the PHC timer 2141 receives and responds to the pulse signal, and automatically stores the count value c1 on the PHC timer 2141 at the rising edge of the pulse signal into the PHC timestamp register 2142. Meanwhile, the interrupt controller 211 receives the pulse signal, and sends an interrupt request to the processor 213 in respond to the pulse signal. In response to the interrupt request, the processor 213 reads a system time value Sys_time (corresponding to a system time value Sys_time at the interrupt response moment) of the in-vehicle SOC 22 and the count value c2 on the PHC timer 2141 (corresponding to the count value c2 at the interrupt response moment) from an interrupt service program.

Finally, the processor 213 reads the c1 in the PHC timestamp register 2142 and the satellite time T1 on the UART interface 212, and corrects the system time of the in-vehicle SOC 12 based on the c1, the c2, the Sys_time, and the T1, to implement the GPS time synchronization.

Description is made by using an example in which an operating system carried by the in-vehicle SOC 22 is a non-real-time operating system. In the foregoing GPS time synchronization process, the processor 213 also responds to the interrupt request after an interrupt response latency, and reads the system time value Sys_time of the in-vehicle SOC 22. However, during the GPS time synchronization process, a time value for triggering the interrupt request and a time value for responding to the interrupt request can be obtained, so as to obtain the interrupt response latency. Therefore, a system time value when a system-on-chip receives a pulse signal may be accurately determined based on the interrupt response latency, so as to accurately perform time synchronization on the system-on-chip. Thus, a problem of large time synchronization errors caused by interrupt response latencys can be avoided, so as to improve accuracy and reliability of time synchronization, thereby improving safety of intelligent driving.

Exemplary Method

Figure 3:
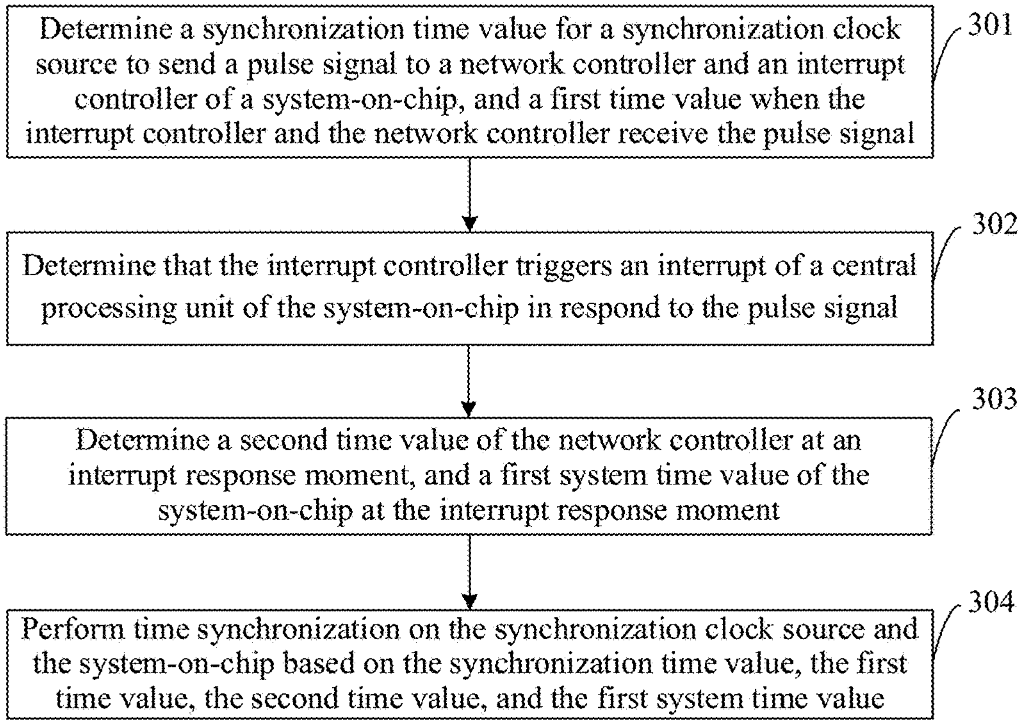
FIG. 3 is a schematic flowchart of a system-on-chip-based time synchronization method according to an exemplary embodiment of this disclosure.

FIG. 3 is a schematic flowchart of a system-on-chip-based time synchronization method according to an exemplary embodiment of this disclosure. As shown in FIG. 3, the system-on-chip-based time synchronization method may include the following steps 301 to 304.

Step 301. Determine a synchronization time value for a synchronization clock source to send a pulse signal to a network controller and an interrupt controller of the system-on-chip, and a first time value when the interrupt controller and the network controller receive the pulse signal.

For example, the synchronization clock source may be a chip or a circuit used for generating a synchronization clock signal. In some examples, the synchronization clock source may be a GPS module that can obtain a satellite clock signal. For example, as shown in FIG. 2, the synchronization clock source may be a GPS module 22.

For example, the synchronization time value may be a time value on the synchronization clock source when the synchronization clock source sends the pulse signal to the network controller and the interrupt controller of the system-on-chip. In some examples, the time value on the synchronization clock source may be a time value corresponding to a satellite clock signal that is received from a satellite in a real-time manner.

For example, the network controller may be a controller in an in-vehicle network. Different in-vehicle networks may correspond to different network controllers. For example, if the in-vehicle network is the Ethernet, the network controller may be an Ethernet controller. If the in-vehicle network is a central-domain control architecture, the network controller is a central-domain controller. This is not limited in this embodiment of this disclosure, and exemplary description is made in the following embodiments by using an example in which the network controller is an Ethernet controller.

For example, the synchronization clock source may send the pulse signal to the network controller and the interrupt controller of the system-on-chip at a particular frequency. In some examples, the particular frequency may be a commonly used synchronization frequency for GPS time synchronization. For example, the particular frequency may be sending a pulse signal every 1 second. In other words, GPS time synchronization is performed on the system-on-chip every 1 second.

For example, an example in which the network controller is the Ethernet controller is used, and reference may be made to FIG. 2. The GPS module 22 (corresponding to the synchronization clock source) may send a pulse signal to an Ethernet controller 214 and an interrupt controller 211 every 1 second. A PHC timer 2141 in the Ethernet controller 214 receives the pulse signal, and responds to the pulse signal to store, at a rising edge of the pulse signal, a count value c1 on the PHC timer 2141 into a PHC timestamp register 2142, and determine a time value corresponding to the count value c1 as the first time value.

In some examples, the time value corresponding to the count value c1 may be a quotient of the count value c1 and a count frequency (such as $f_{PHC}$) of PHC.

For example, as shown in FIG. 2, while sending a pulse signal to the Ethernet controller 214 and the interrupt controller 211 every 1 second, the GPS module 22 sends satellite time T1 obtained by the GPS module 22 at a current moment to an UART interface 212 in an in-vehicle SOC 21, and determines the satellite time T1 as a synchronization time value T1.

Step 302. Determine that the interrupt controller triggers an interrupt of a central processing unit of the system-on-chip in respond to the pulse signal.

For example, after receiving the pulse signal, the interrupt controller may respond to the pulse signal to generate a CPU interrupt request, and send the interrupt request to the CPU to trigger the CPU to process an interrupt service program. For example, as shown in FIG. 2, after receiving the pulse signal sent by the GPS module 22, the interrupt controller 211 may respond to the pulse signal and send an interrupt request to the processor 213, to trigger the processor 213 to process the interrupt service program corresponding to the interrupt request.

In some examples, time for the interrupt controller to respond to the pulse signal and send the interrupt request to the CPU is very small, which is much smaller than the interrupt response latency. Therefore, both time when the interrupt controller receives the pulse signal and time when the interrupt controller responds to the pulse signal and sends the interrupt request to the CPU may be determined as the first time value.

Step 303. Determine a second time value of the network controller at an interrupt response moment, and a first system time value of the system-on-chip at the interrupt response moment.

For example, as shown in FIG. 2, the second time value of the network controller at the interrupt response moment may be a time value corresponding to a count value c2 of the PHC timer 2141 in the Ethernet controller 214 at the interrupt response moment. The first system time value of the system-on-chip at the interrupt response moment refers to a system time value Sys_time of the in-vehicle SOC 21 at the interrupt response moment.

In some examples, the count value c2 of the PHC timer 2141 at the interrupt response moment may be read in the interrupt service program of the interrupt request through a count value reading instruction, and the second time value may be determined based on the read count value c2. In other words, the second time value may be a time value corresponding to the count value c2. For example, the second time value may be a quotient of the read count value c2 and the count frequency of the PHC.

In some examples, the first system time value Sys_time at the interrupt response moment may be read in the service program of the interrupt request through a system time reading instruction.

For example, to obtain the second time value at the interrupt response moment and the first system time value Sys_time at the interrupt response moment, the second time value and the first system time value need to be read in the interrupt service program, continuously.

In some examples, after a spin lock in the interrupt service program is locked, the count value c2 may be read through the count value reading instruction, and the first system time value Sys_time may be read through the system time read instruction. Moreover, the spin lock may be unlocked after the count value c2 and the first system time value Sys_time are read. In this way, it is ensured that the count value reading instruction and the system time reading instruction are executed continuously, and the CPU is not dispatched midway.

In some examples, the second time value may be read first and then the first system time value is read, or the first system time value may be read first and then the second time value is read. An order of reading the second time value and the first system time value is not limited in this embodiment of this disclosure.

Step 304. Perform time synchronization on the synchronization clock source and the system-on-chip based on the synchronization time value, the first time value, the second time value, and the first system time value.

For example, a first operation may be performed on the synchronization time value, the first time value, the second time value, and the first system time value; and system time of the system-on-chip may be adjusted based on a first operation result, so that time of the system-on-chip is synchronized with that of the synchronization clock source.

In some examples, the first operation result may include a system time value of the system-on-chip when the synchronization clock source sends the pulse signal to the network controller and the interrupt controller or when the network controller and the interrupt controller receive the pulse signal. Adjusting the system time of the system-on-chip based on the first operation result may include adjusting the time of the system-on-chip based on the system time value when the synchronization clock source sends the pulse signal to the network controller and the interrupt controller and the synchronization time value.

In this embodiment of this disclosure, the interrupt response latency can be accurately obtained by determining the first time value when the interrupt controller and the network controller receive the pulse signal and the second time value of the network controller at the interrupt response moment. Thus, the system time value when the system-on-chip receives the pulse signal can be accurately determined based on the first time value when the interrupt controller and the network controller receive the pulse signal, the second time value of the network controller at the interrupt response moment, and the first system time value of the system-on-chip at the interrupt response moment. In this way, time synchronization can be accurately performed on the system-on-chip based on the system time value when the system-on-chip receives the pulse signal and the synchronization time value for the synchronization clock source to send the pulse signal to the network controller and the interrupt controller. Thus, a problem of large time synchronization errors caused by interrupt response latencys is avoided, so as to improve accuracy and reliability of time synchronization, thereby improving safety of intelligent driving.

Figure 4:
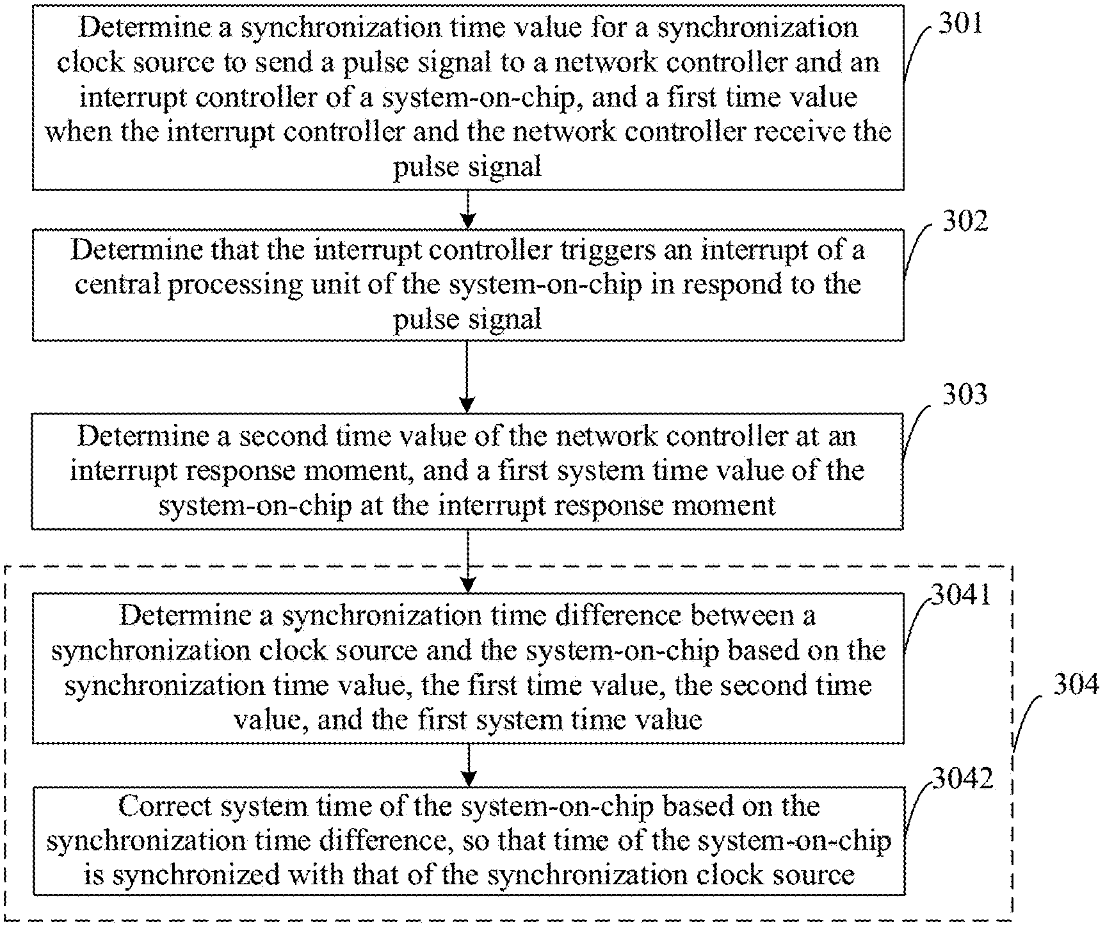
FIG. 4 is a schematic flowchart of another system-on-chip-based time synchronization method according to an exemplary embodiment of this disclosure.

As shown in FIG. 4, on the basis of the embodiment shown in FIG. 3, step 304 may include the following steps 3041 and 3042.

Step 3041. Determine a synchronization time difference between a synchronization clock source and the system-on-chip based on the synchronization time value, the first time value, the second time value, and the first system time value.

In some examples, the interrupt response latency may be determined based on the first time value and the second time value; the second system time value of the system-on-chip when the synchronization clock source sends the pulse signal may be determined based on the interrupt response latency and the first system time value; and the synchronization time difference may be determined based on the second system time value and the synchronization time value.

For example, the interrupt response latency refers to a time difference between time when the CPU interrupt is triggered and time when the interrupt service program is executed in response to the CPU interrupt, that is, a difference between the first time value when the network controller receives the pulse signal and the second time value of the network controller at the interrupt response moment.

In this embodiment of this disclosure, the interrupt response latency may be accurately determined based on the first time value and the second time value. In this way, the second system time value of the system-on-chip when the synchronization clock source sends the pulse signal may be accurately determined based on the accurate interrupt response latency and the first system time value. Thus, the synchronization time difference may be accurately determined based on the accurate second system time value and the synchronization time value. Therefore, a problem of large time synchronization errors caused by interrupt response latencys can be avoided, so as to improve accuracy and reliability of time synchronization, thereby improving safety of intelligent driving.

In some examples, the first time difference between the first time value and the second time value may be determined, and the first time difference may be determined as the interrupt response latency. For example, the first time value is $c1/f_{PHC}$, the second time value is $c2/f_{PHC}$, and the interrupt response latency is latency=$c1/f_{PHC}-c2/f_{PHC}$.

In this embodiment of this disclosure, the interrupt response latency may be accurately determined based on the first time difference between the first time value and the second time value, which can reduce an error in the second system time value of the system-on-chip when the synchronization clock source sends the pulse signal.

In some examples, the second time difference between the first system time value Sys_time and the interrupt response latency "latency" may be determined; and the second time difference may be determined as the second system time value. For example, the second system time value satisfies Real_Sys_time-Sys_time-latency.

In this embodiment of this disclosure, the second system time value of the system-on-chip when the synchronization clock source sends the pulse signal may be accurately determined based on the second time difference between the first system time value and the interrupt response latency, which can reduce an error in the synchronization time difference.

In some examples, a third time difference between the second system time value Real_Sys_time and the synchronization time value T1 may be determined; and the third time difference may be determined as a synchronization time difference offset. For example, the synchronization time difference satisfies offset=Real_Sys_time-T1.

In this embodiment of this disclosure, the synchronization time difference between the synchronization clock source and the system-on-chip may be accurately determined based on the second system time value and the synchronization time value, which can reduce an error in time synchronization.

For example, a second operation may be performed on the synchronization time value, the first time value, the second time value, and the first system time value; and a calculation result of the second operation may be determined as the synchronization time difference between the synchronization clock source and the system-on-chip. In some examples, the second operation may be a part of the first operation. The second operation may include Sys_time−(c1/$f_{PHC}$−c2/$f_{PHC}$)−T1.

Step 3042. Correct system time of the system-on-chip based on the synchronization time difference, so that time of the system-on-chip is synchronized with that of the synchronization clock source.

For example, the system time of the system-on-chip may be corrected by using a correction component, so that the time of the system-on-chip is synchronized with that of the synchronization clock source.

In some examples, the synchronization time difference may be sent to the correction component through a socket channel; and the system time of the system-on-chip may be corrected by using the correction component based on the synchronization time difference, so that the time of the system-on-chip is synchronized with that of the synchronization clock source.

For example, the socket channel may be a communication pipeline for transmitting the synchronization time difference to the correction component. The correction component may be a chronyd component, which is not specifically limited in this embodiment of this disclosure.

In this embodiment of this disclosure, the synchronization time difference is sent to the correction component through the socket channel, and the correction component corrects the system time of the system-on-chip based on the synchronization time difference. In this way, time synchronization can be implemented for the system-on-chip and the synchronization clock source.

In this embodiment of this disclosure, the synchronization time difference between the synchronization clock source and the system-on-chip is determined based on the synchronization time value, the first time value, the second time value, and the first system time value; and the system time of the system-on-chip is corrected based on the synchronization time difference. Therefore, in the case that accuracy of the determined synchronization time difference is relatively high, synchronization accuracy of the time synchronization for the system-on-chip may be improved, thereby improving the safety of intelligent driving.

Figure 5:
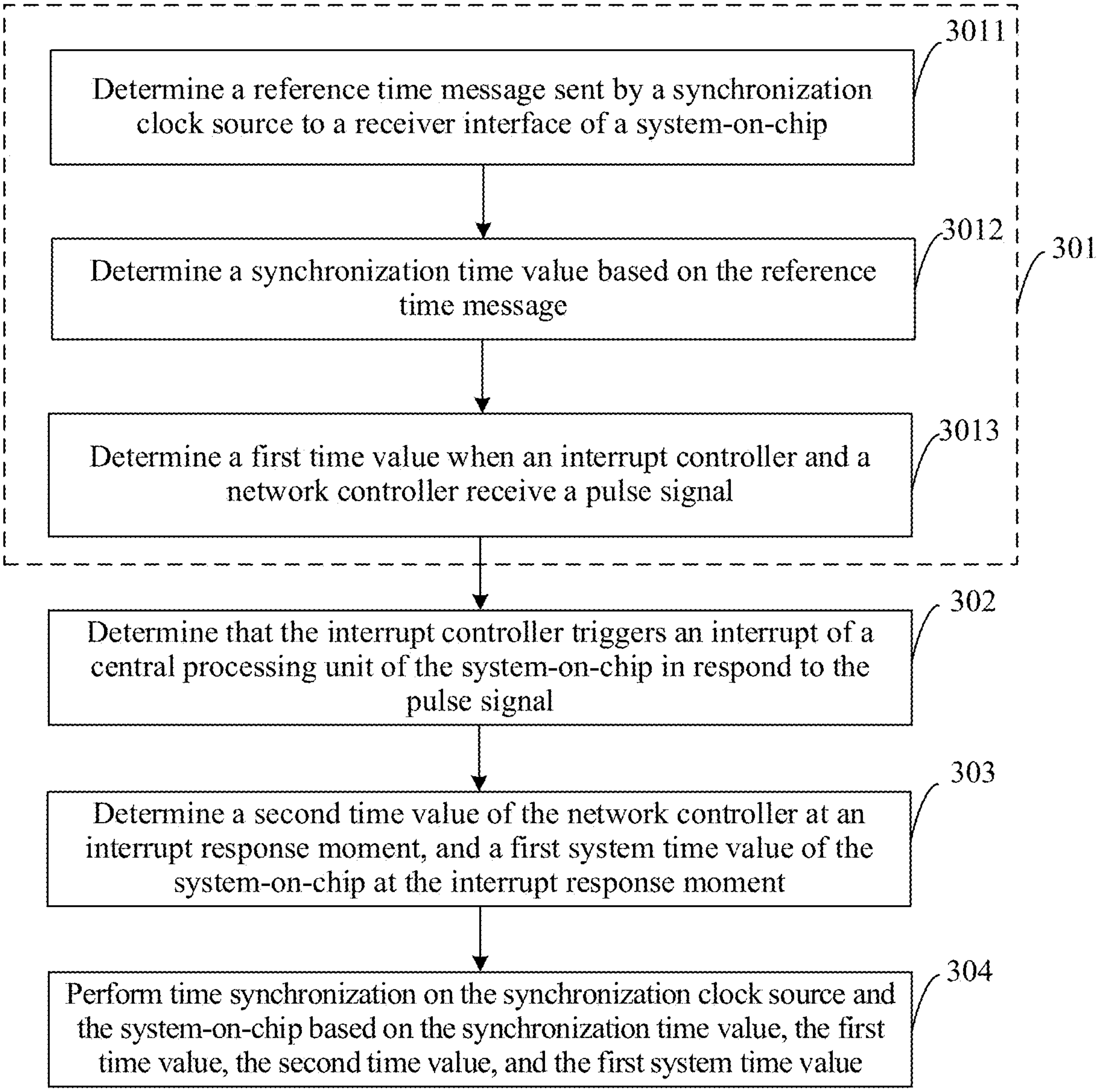
FIG. 5 is a schematic flowchart of still another system-on-chip-based time synchronization method according to an exemplary embodiment of this disclosure.

As shown in FIG. 5, on the basis of the embodiment shown in FIG. 3, step 301 may include the following steps 3011 to 3013.

Step 3011. Determine a reference time message sent by the synchronization clock source to a receiver interface of the system-on-chip.

Sending time of the reference time message is same as that of the pulse signal.

For example, the reference time message includes the satellite time T1 that is obtained by the GPS module from a satellite at the current moment.

In some examples, as shown in FIG. 2, the reference time message is sent to the UART interface 212 while a pulse signal is sent to the interrupt controller 211 and the PHC timer 2141.

Step 3012. Determine the synchronization time value based on the reference time message.

For example, the reference time message may be parsed to obtain the satellite time T1, and the satellite time T1 may be determined as the synchronization time value.

Step 3013. Determine the first time value when the interrupt controller and the network controller receive the pulse signal.

In this embodiment of this disclosure, since sending time of a reference message is same as that of the pulse signal, that is, time in the reference time message is same as the sending time for sending the pulse signal, the accurate sending time for sending the pulse signal may be obtained by parsing the reference message, that is, the accurate synchronization time value may be obtained.

Figure 6:
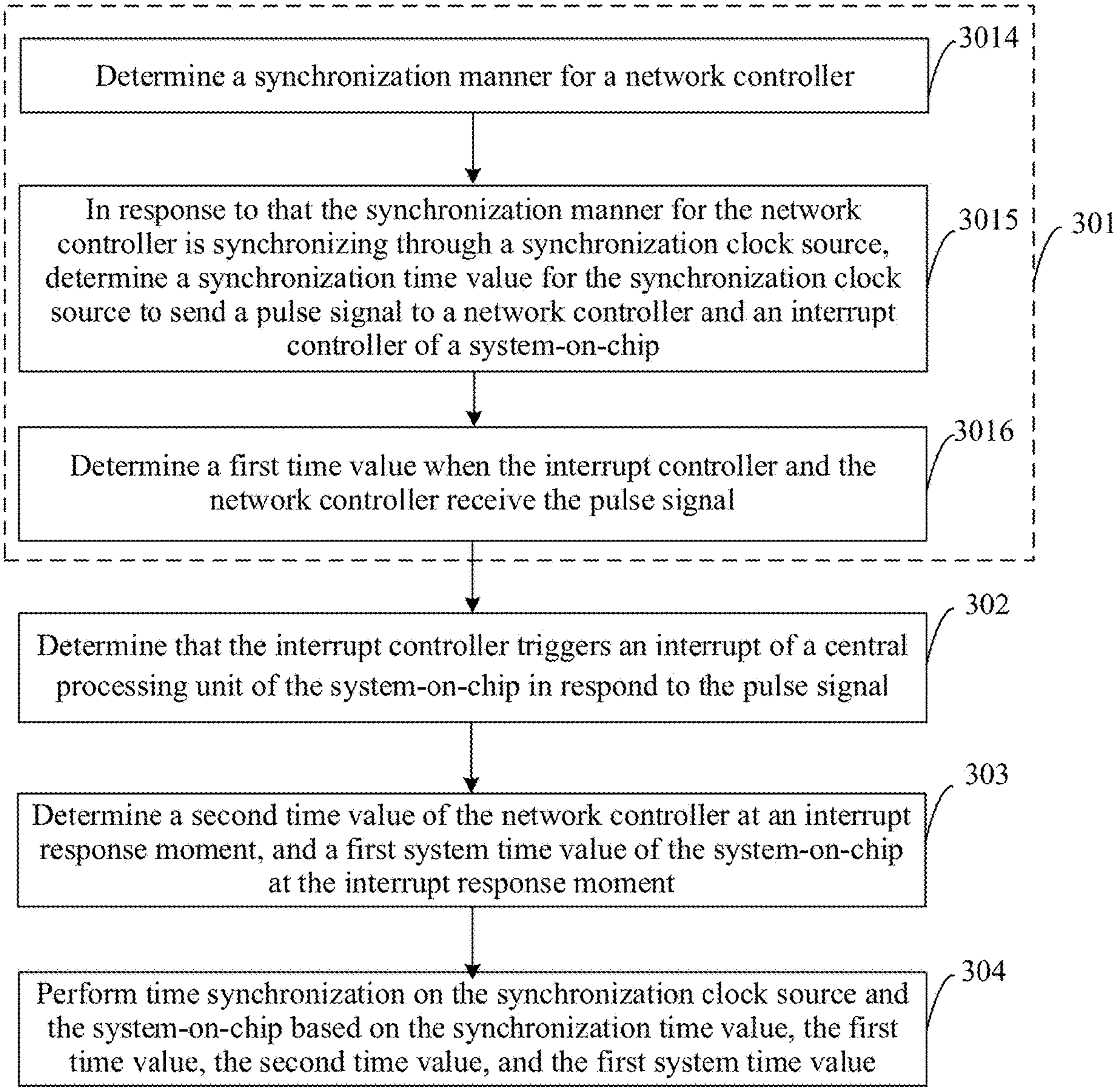
FIG. 6 is a schematic flowchart of yet another system-on-chip-based time synchronization method according to an exemplary embodiment of this disclosure.

As shown in FIG. 6, on the basis of the embodiment shown in FIG. 3, step 301 may include the following steps 3014 to 3016.

Step 3014. Determine a synchronization manner for the network controller.

For example, synchronization manners of the network controller include synchronizing through a PTP node and synchronizing through the synchronization clock source (GPS module synchronization). In some examples, synchronizing through a PTP node is to use the network controller as a PTP slave node and performing time synchronization on the network controller through a PTP master node. Synchronizing through the synchronization clock source is to use the network controller as a master node and performing time synchronization on the network controller through the pulse signal sent by the synchronization clock source.

For example, whether the network controller is a PTP master node or a PTP slave node may be determined through a query instruction. When it is determined that the network controller is a PTP master node, it is determined that the synchronization manner for the network controller is synchronizing through the synchronization clock source. When it is determined that the network controller is a PTP slave node, it is determined that the synchronization manner for the network controller is synchronizing through the PTP node.

Step 3015. In response to that the synchronization manner for the network controller is synchronizing through the synchronization clock source, determine the synchronization time value for the synchronization clock source to send the pulse signal to the network controller and the interrupt controller of the system-on-chip.

For example, the synchronization time value for the synchronization clock source to send the pulse signal to the network controller and the interrupt controller of the system-on-chip may be determined when it is determined that the system time of the system-on-chip is synchronized through the synchronization clock source. In other words, the embodiment shown in FIG. 3 is applicable to the case in which the network controller is the PTP master node.

Step 3016. Determine the first time value when the interrupt controller and the network controller receive the pulse signal.

In this embodiment of this disclosure, by determining the synchronization mode of the network controller, and when it is determined that the synchronization manner for the network controller is synchronizing through the synchronization clock source, the synchronization time value for the synchronization clock source to send the pulse signal to the network controller and the interrupt controller of the system-on-chip is determined. In this way, the time synchronization for the system-on-chip can be implemented.

Figure 7:
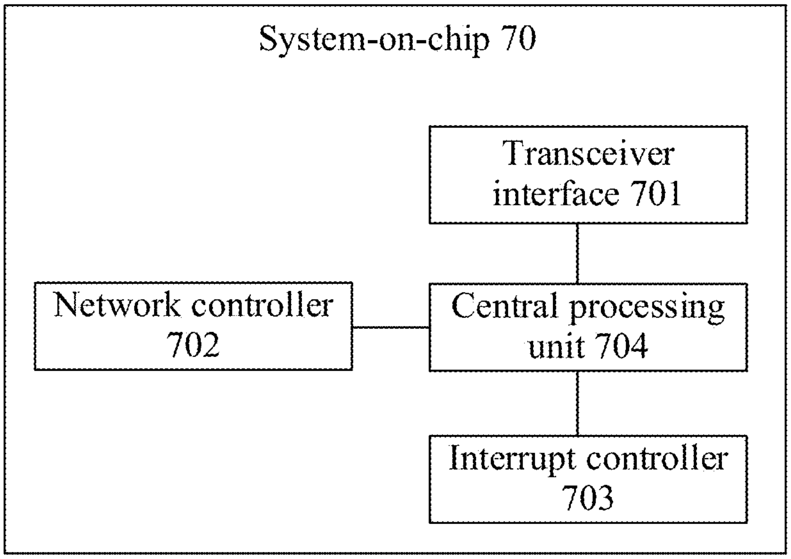
FIG. 7 is a schematic diagram of a composition and structure of a system-on-chip according to an exemplary embodiment of this disclosure.

On the basis of the foregoing embodiment, an embodiment of this disclosure provides a system-on-chip. FIG. 7 is a schematic diagram of a composition and structure of a system-on-chip according to an exemplary embodiment of this disclosure. As shown in FIG. 7, a system-on-chip 70 includes a transceiver interface 701, a network controller 702, an interrupt controller 703, and a central processing unit 704.

The transceiver interface 701 is configured to receive a synchronization time value sent from a synchronization clock source.

The network controller 702 is configured to receive and respond to a pulse signal sent from the synchronization clock source, and determine a first time value when receiving the pulse signal.

The interrupt controller 703 is configured to receive and respond to the pulse signal sent from the synchronization clock source, and trigger an interrupt of a central processing unit.

The central processing unit 704 is coupled to the network controller 702, the interrupt controller 703, and the transceiver interface 701, and is configured to obtain the synchronization time value and the first time value; determine, in response to the interrupt of the central processing unit, a second time value of the network controller 702 at an interrupt response moment, and a first system time value of the system-on-chip at the interrupt response moment; and perform time synchronization on the system-on-chip based on the synchronization time value, the first time value, the second time value, and the first system time value.

For example, as shown in FIG. 2, the receiver interface 701 corresponds to the UART interface 212; the network controller 702 corresponds to the Ethernet controller 214; the interrupt controller 703 corresponds to the interrupt controller 211; and the central processing unit 704 corresponds to the processor 213.

Figure 8:
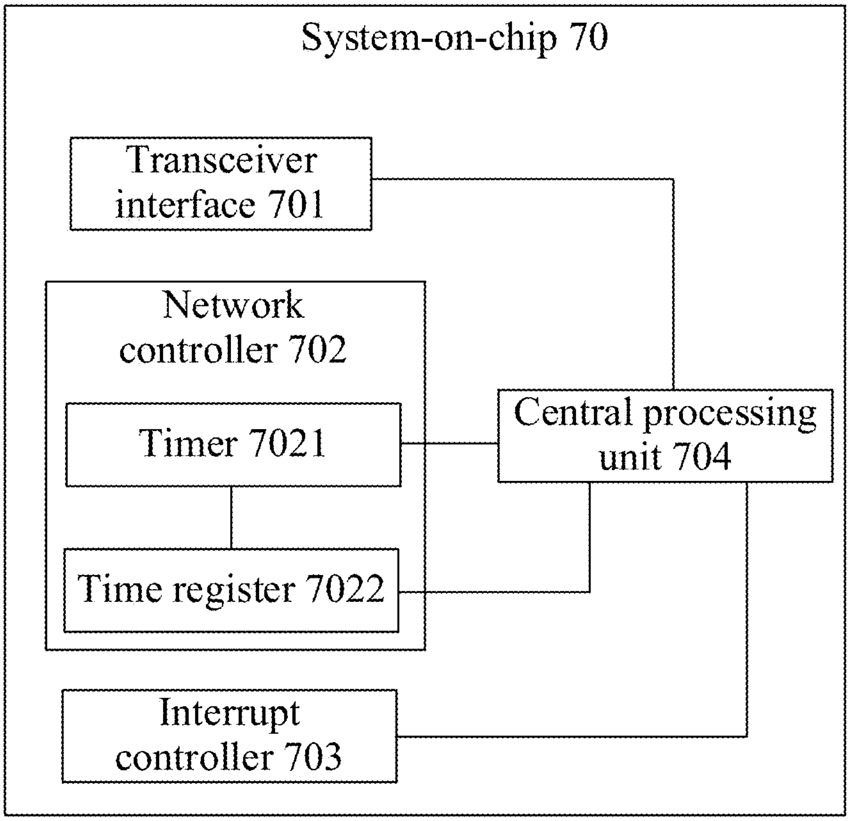
FIG. 8 is a schematic diagram of a composition and structure of another system-on-chip according to an exemplary embodiment of this disclosure.

As shown in FIG. 8, on the basis of the embodiment shown in FIG. 7, the network controller 702 may include a timer 7021 and a time register 7022.

The timer 7021 is configured to receive and respond to the pulse signal, and send a first count value to the time register 7022.

The time register 7022 is configured to store the first count value.

The central processing unit 704 is coupled to the time register 7022, and is configured to read the first count value, and determine the first time value based on the first count value.

The central processing unit 704 is coupled to the timer 7021, and is configured to read a second count value at the interrupt response moment, and determine the second time value based on the second count value.

For example, as shown in FIG. 2, the timer 7021 corresponds to the PHC timer 2141; and the time register 7022 corresponds to the PHC timestamp register 2142.

Exemplary Apparatus

Figure 9:
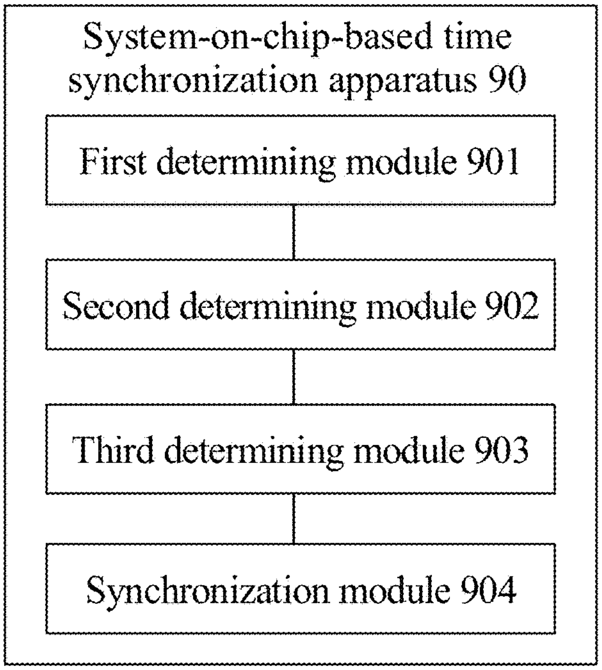
FIG. 9 is a schematic diagram of a composition and structure of a system-on-chip-based time synchronization apparatus according to an exemplary embodiment of this disclosure.

FIG. 9 is a schematic diagram of a composition and structure of a system-on-chip-based time synchronization apparatus according to an exemplary embodiment of this disclosure. As shown in FIG. 9, a system-on-chip-based time synchronization apparatus 90 may include a first determining module 901, a second determining module 902, a third determining module 903, and a synchronization module 904.

The first determining module 901 is configured to determine a synchronization time value for a synchronization clock source to send a pulse signal to a network controller and an interrupt controller of the system-on-chip, and a first time value when the interrupt controller and the network controller receive the pulse signal.

The second determining module 902 is configured to determine that the interrupt controller triggers an interrupt of a central processing unit of the system-on-chip in respond to the pulse signal.

The third determining module 903 is configured to determine a second time value of the network controller at an interrupt response moment, and a first system time value of the system-on-chip at the interrupt response moment.

The synchronization module 904 is configured to perform time synchronization on the system-on-chip based on the synchronization time value, the first time value, the second time value, and the first system time value.

Figure 10:
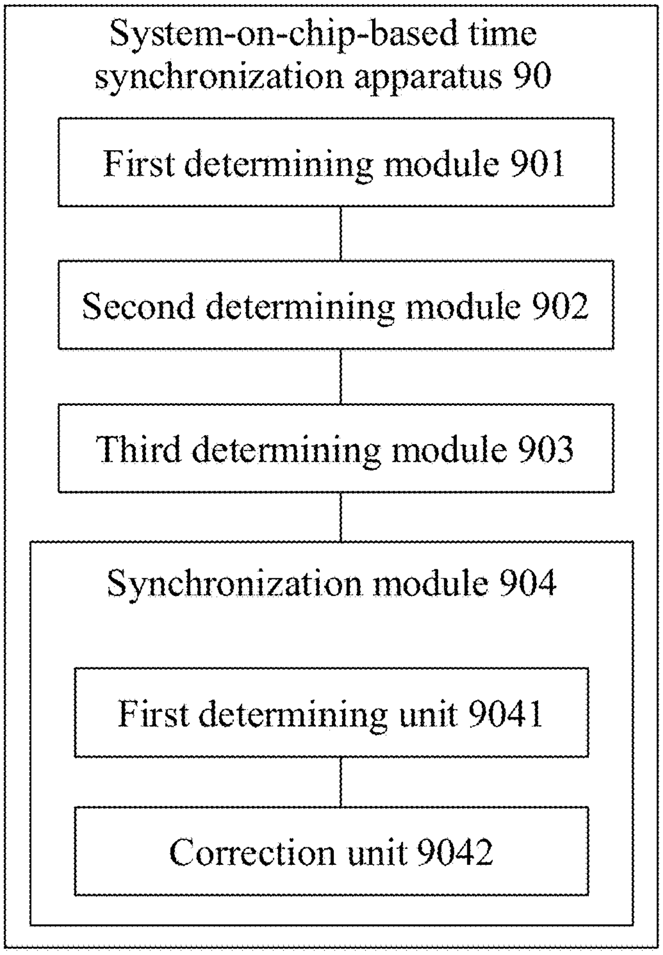
FIG. 10 is a schematic diagram of a composition and structure of another system-on-chip-based time synchronization apparatus according to an exemplary embodiment of this disclosure.

In some embodiments, as shown in FIG. 10, on the basis of the embodiment shown in FIG. 9, the synchronization module 904 may include a first determining unit 9041 and a correction unit 9042.

The first determining unit 9041 determines a synchronization time difference between a synchronization clock source and the system-on-chip based on the synchronization time value, the first time value, the second time value, and the first system time value.

The correction unit 9042 corrects system time of the system-on-chip based on the synchronization time difference, so that time of the system-on-chip is synchronized with that of the synchronization clock source.

Figure 11:
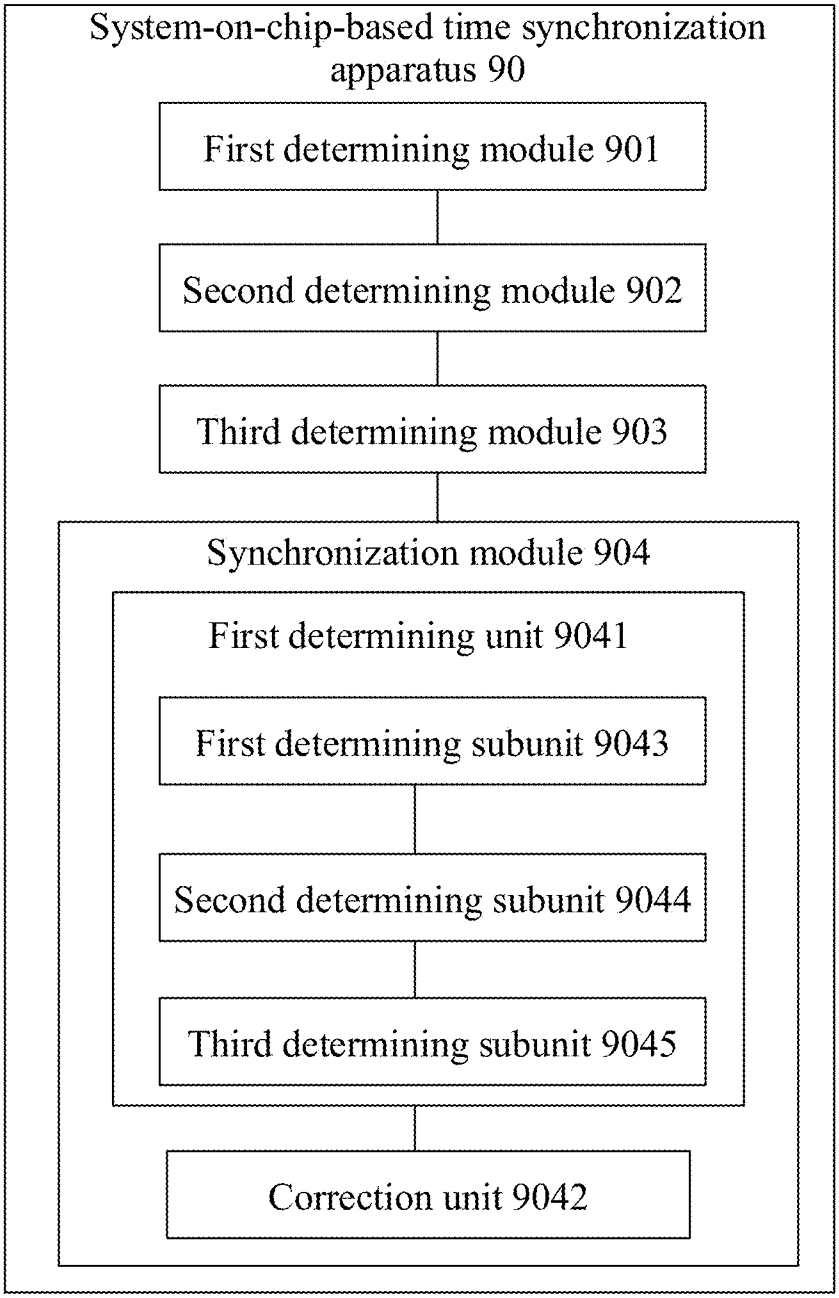
FIG. 11 is a schematic diagram of a composition and structure of still another system-on-chip-based time synchronization apparatus according to an exemplary embodiment of this disclosure.

In some embodiments, as shown in FIG. 11, on the basis of the embodiment shown in FIG. 10, the first determining unit 9041 includes a first determining subunit 9043, a second determining subunit 9044, and a third determining subunit 9045.

The first determining subunit 9043 is configured to determine an interrupt response latency based on the first time value and the second time value.

The second determining subunit 9044 is configured to determine, based on the interrupt response latency and the first system time value, a second system time value of the system-on-chip when the synchronization clock source sends the pulse signal.

The third determining subunit 9045 is configured to determine the synchronization time difference based on the second system time value and the synchronization time value.

In some embodiments, the first determining subunit 9043 is configured to determine a first time difference between the first time value and the second time value; and determine the first time difference as the interrupt response latency. The second determining subunit 9044 is configured to determine a second time difference between the first system time value and the interrupt response latency; and determine the second time difference as the second system time value. The third determining subunit 9045 is configured to determine a third time difference between the second system time value and the synchronization time value; and determine the third time difference as the synchronization time difference.

Figure 12:
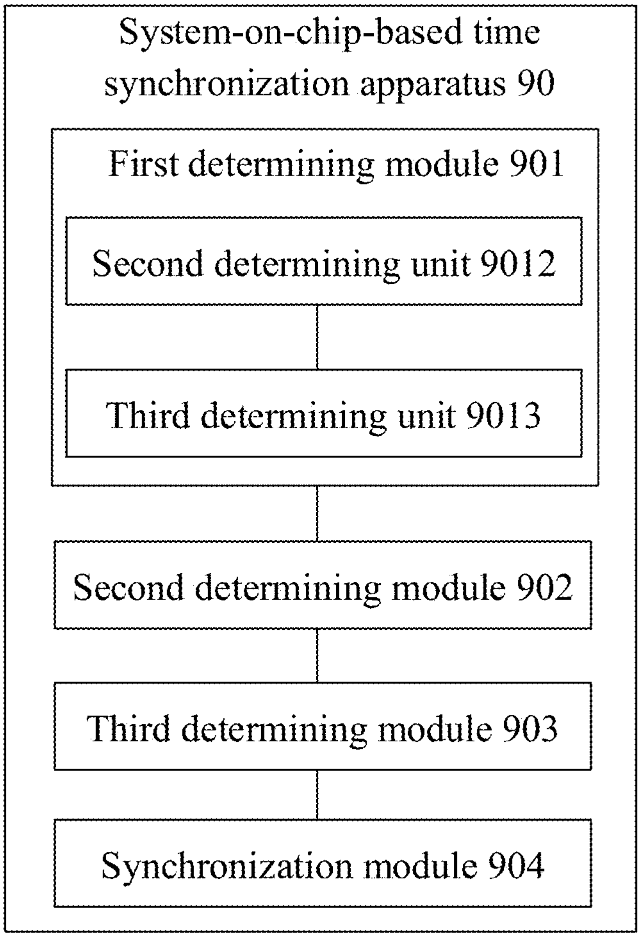
FIG. 12 is a schematic diagram of a composition and structure of yet another system-on-chip-based time synchronization apparatus according to an exemplary embodiment of this disclosure.

In some embodiments, as shown in FIG. 12, on the basis of the embodiment shown in FIG. 9, the first determining module 901 includes a second determining unit 9012 and a third determining unit 9013.

The second determining unit 9012 is configured to determine a reference time message sent by the synchronization clock source to a receiver interface of the system-on-chip, wherein sending time of the reference time message is same as that of the pulse signal.

The third determining unit 9013 is configured to determine the synchronization time value based on the reference time message.

Figure 13:
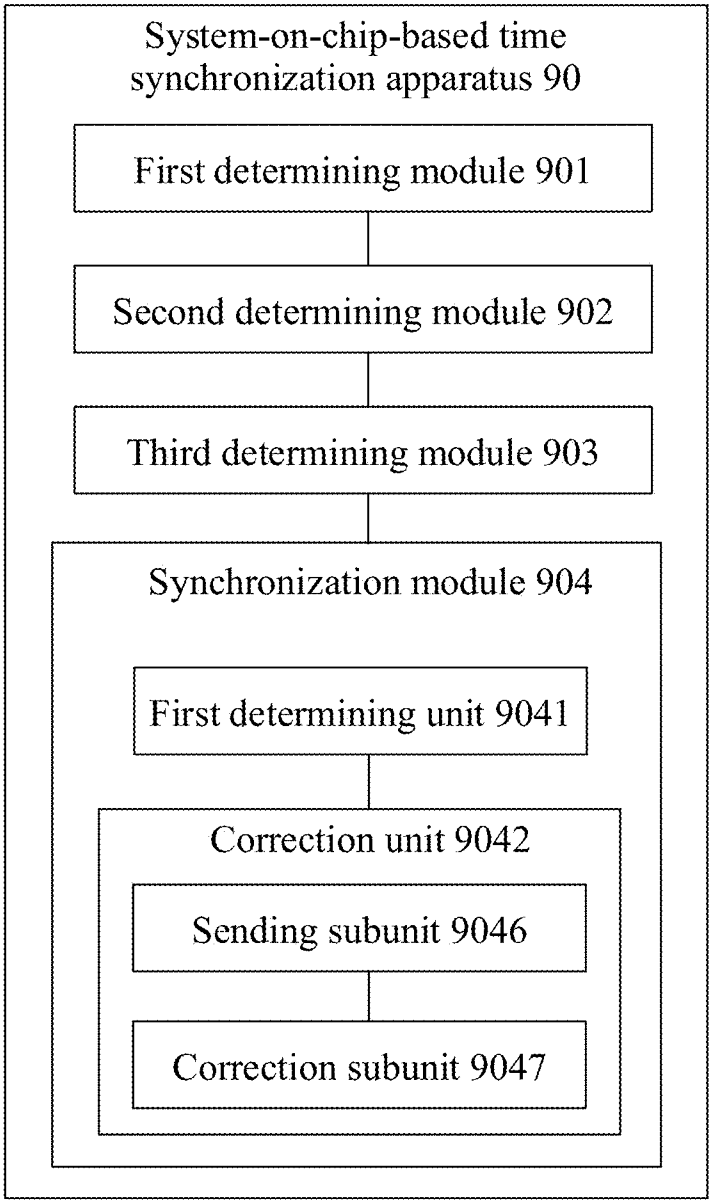
FIG. 13 is a schematic diagram of a composition and structure of still yet another system-on-chip-based time synchronization apparatus according to an exemplary embodiment of this disclosure.

In some embodiments, as shown in FIG. 13, on the basis of the embodiment shown in FIG. 10, the correction unit 9042 may include a sending subunit 9046 and a correction subunit 9047.

The sending subunit 9046 is configured to send the synchronization time difference to a correction component through a socket channel.

The correction subunit 9047 is configured to correct the system time of the system-on-chip based on the synchronization time difference by using the correction component, so that the time of the system-on-chip is synchronized with that of the synchronization clock source.

Figure 14:
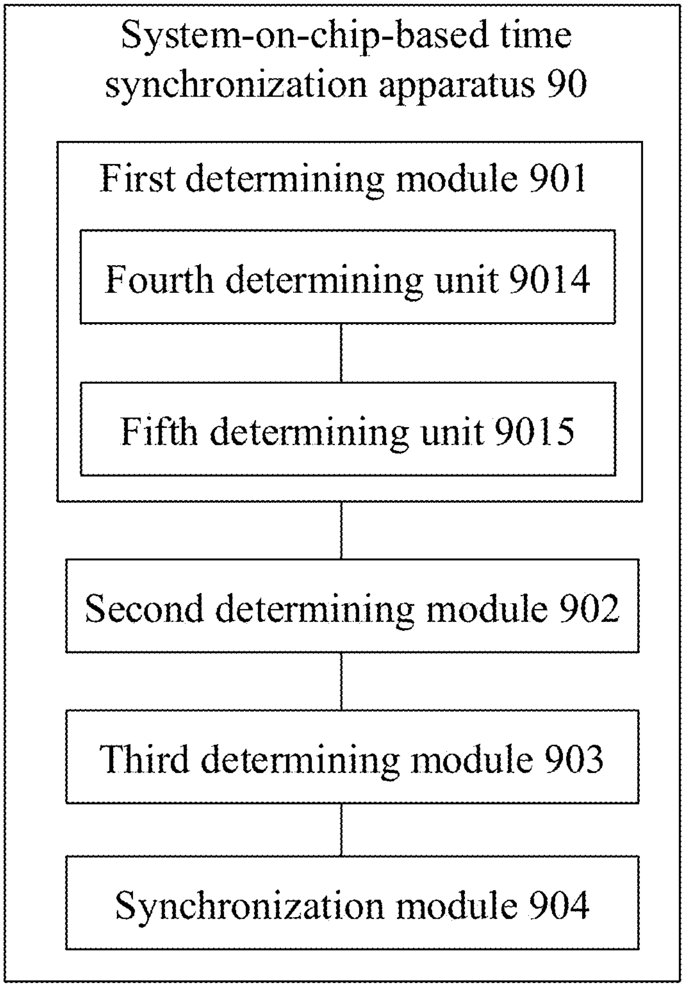
FIG. 14 is a schematic diagram of a composition and structure of a further system-on-chip-based time synchronization apparatus according to an exemplary embodiment of this disclosure.

In some embodiments, as shown in FIG. 14, on the basis of the embodiment shown in FIG. 9, the first determining module 901 includes a fourth determining unit 9014 and a fifth determining unit 9015.

The fourth determining unit 9014 is configured to determine a synchronization manner for the network controller.

The fifth determining unit 9015 is configured to determine, in response to that the synchronization manner for the network controller is synchronizing through the synchronization clock source, the synchronization time value for the synchronization clock source to send the pulse signal to the network controller and the interrupt controller of the system-on-chip.

Regarding the system-on-chip-based time synchronization apparatus in the foregoing embodiments, specific manners for each module to perform operations and corresponding beneficial effects have been described in detail in the corresponding embodiments of the system-on-chip-based time synchronization method, and reference may be made to the corresponding operation execution manners and the beneficial technical effects in the part of exemplary method described above, and details are not described herein again.

Exemplary Electronic Device

Figure 15:
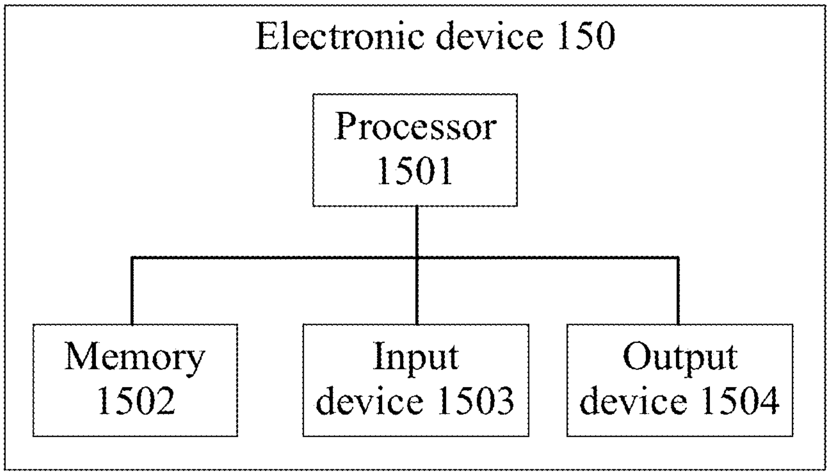
FIG. 15 is a schematic diagram of a composition and structure of an electronic device according to an exemplary embodiment of this disclosure.

FIG. 15 is a schematic diagram of a composition and structure of an electronic device according to an exemplary embodiment of this disclosure. As shown in FIG. 15, an electronic device 150 includes one or more processors 1501 and a memory 1502.

The processor 1501 may be a central processing unit (CPU) or another form of processing unit having a data processing capability and/or an instruction execution capability, and may control another component in the electronic device 150 to implement a desired function.

The memory 1502 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium.

The processor 1501 may execute the program instruction to implement the system-on-chip-based time synchronization method according to various embodiments of this disclosure that are described above and/or other desired functions.

In an example, the electronic device 150 may further include an input device 1503 and an output device 1504. These components are connected to each other through a bus system and/or another form of connection mechanism (not shown).

Certainly, for simplicity, FIG. 15 shows only some of components in the electronic device 150 that are related to this application, and components such as a bus and an input/output interface are omitted. In addition, according to specific application situations, the electronic device 150 may further include any other appropriate components.

Exemplary Computer Program Product and Computer Readable Storage Medium

In addition to the foregoing method and device, the embodiments of this application may also relate to a computer program product, which includes computer program instructions. When the computer program instructions are run by a processor, the processor is enabled to perform the steps, of the system-on-chip-based time synchronization method according to the embodiments of this application, that are described in the "exemplary method" part of this specification.

The computer program product may be program code, written with one or any combination of a plurality of programming languages, that is configured to perform the operations in the embodiments of this application. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this application may further relate to a computer readable storage medium, which stores computer program instructions. When the computer program instructions are run by the processor, the processor is enabled to perform the steps, of the system-on-chip-based time synchronization method according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this application are described above in combination with specific embodiments. However, it should be pointed out that the advantages, superiorities, and effects mentioned in this application are merely examples but are not for limitation, and it cannot be considered that these advantages, superiorities, and effects are necessary for each embodiment of this application. In addition, specific details described above are merely for examples and for ease of understanding, rather than limitations. The details described above do not limit that this application must be implemented by using the foregoing specific details.

The block diagrams of the equipment, the apparatus, the device, and the system involved in this application are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and can be used interchangeably with "including but not limited to". The terms "or" and "and" used herein refer to the term "and/or", and can be used interchangeably with "and/or", unless the context clearly indicates otherwise. The term "such as" used herein refers to the phrase "such as but not limited to", and can be used interchangeably with "such as but not limited to".

It should be further pointed out that, various components or various steps in the apparatus, the device, and the method of this application may be disassembled and/or recombined. These disassembling and/or recombinations shall be regarded as equivalent solutions of this application.

The foregoing description about the disclosed aspects is provided, so that this application can be arrived at or carried out by any person skilled in the art. Various modifications to these aspects are very obvious to a person skilled in the art. Moreover, general principles defined herein may be applicable to other aspects without departing from the scope of this application. Therefore, this application is not intended to be limited to the aspects illustrated herein, but to the widest scope consistent with the principles and novel features disclosed herein.

The foregoing descriptions are given for illustration and description. In addition, the description is not intended to limit the embodiments of this application to forms disclosed herein. Although a plurality of exemplary aspects and embodiments have been discussed above, a person skilled in the art may recognize certain variations, modifications, changes, additions, and sub-combinations thereof.

What is claimed is:

1. A system-on-chip-based time synchronization method, comprising:

determining a synchronization time value for a synchronization clock source to send a pulse signal to a network controller and an interrupt controller of the system-on-chip, and a first time value when the interrupt controller and the network controller receive the pulse signal;

determining that the interrupt controller triggers an interrupt of a central processing unit of the system-on-chip in respond to the pulse signal;

determining a second time value of the network controller at an interrupt response moment, and a first system time value of the system-on-chip at the interrupt response moment; and performing time synchronization on the system-on-chip based on the synchronization time value, the first time value, the second time value, and the first system time value.

2. The method according to claim 1, wherein the performing time synchronization on the system-on-chip based on the synchronization time value, the first time value, the second time value, and the first system time value comprises:

determining a synchronization time difference between a synchronization clock source and the system-on-chip based on the synchronization time value, the first time value, the second time value, and the first system time value; and correcting system time of the system-on-chip based on the synchronization time difference, so that time of the system-on-chip is synchronized with that of the synchronization clock source.

3. The method according to claim 2, wherein the determining a synchronization time difference between a synchronization clock source and the system-on-chip based on the synchronization time value, the first time value, the second time value, and the first system time value comprises:

determining an interrupt response latency based on the first time value and the second time value;

determining, based on the interrupt response latency and the first system time value, a second system time value of the system-on-chip when the synchronization clock source sends the pulse signal; and determining the synchronization time difference based on the second system time value and the synchronization time value.

4. The method according to claim 3, wherein the determining an interrupt response latency based on the first time value and the second time value comprises:

determining a first time difference between the first time value and the second time value; and determining the first time difference as the interrupt response latency.

5. The method according to claim 3, wherein the determining, based on the interrupt response latency and the first system time value, a second system time value of the system-on-chip when the synchronization clock source sends the pulse signal comprises:

determining a second time difference between the first system time value and the interrupt response latency; and determining the second time difference as the second system time value.

6. The method according to claim 3, wherein the determining the synchronization time difference based on the second system time value and the synchronization time value comprises:

determining a third time difference between the second system time value and the synchronization time value; and determining the third time difference as the synchronization time difference.

7. The method according to claim 1, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

8. The method according to claim 2, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

9. The method according to claim 3, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

10. The method according to claim 4, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

11. The method according to claim 5, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

12. The method according to claim 6, wherein the determining a synchronization time value for a synchronization clock source to send a pulse signal to a network controller and an interrupt controller of the system-on-chip comprises:

determining a reference time message sent by the synchronization clock source to a receiver interface of the system-on-chip, wherein sending time of the reference time message is same as that of the pulse signal; and determining the synchronization time value based on the reference time message.

13. The method according to claim 2, wherein the correcting system time of the system-on-chip based on the synchronization time difference, so that time of the system-on-chip is synchronized with that of the synchronization clock source comprises:

sending the synchronization time difference to a correction component through a socket channel; and correcting the system time of the system-on-chip based on the synchronization time difference by using the correction component, so that the time of the system-on-chip is synchronized with that of the synchronization clock source.

14. The method according to claim 3, wherein the correcting system time of the system-on-chip based on the synchronization time difference, so that time of the system-on-chip is synchronized with that of the synchronization clock source comprises:

sending the synchronization time difference to a correction component through a socket channel; and correcting the system time of the system-on-chip based on the synchronization time difference by using the correction component, so that the time of the system-on-chip is synchronized with that of the synchronization clock source.

15. The method according to claim 4, wherein the correcting system time of the system-on-chip based on the synchronization time difference, so that time of the system-on-chip is synchronized with that of the synchronization clock source comprises:

sending the synchronization time difference to a correction component through a socket channel; and correcting the system time of the system-on-chip based on the synchronization time difference by using the correction component, so that the time of the system-on-chip is synchronized with that of the synchronization clock source.

16. The method according to claim 5, wherein the correcting system time of the system-on-chip based on the synchronization time difference, so that time of the system-on-chip is synchronized with that of the synchronization clock source comprises:

sending the synchronization time difference to a correction component through a socket channel; and correcting the system time of the system-on-chip based on the synchronization time difference by using the correction component, so that the time of the system-on-chip is synchronized with that of the synchronization clock source.

17. The method according to claim 1, wherein the determining a synchronization time value for a synchronization clock source to send a pulse signal to a network controller and an interrupt controller of the system-on-chip comprises:

determining a synchronization manner for the network controller; and in response to that the synchronization manner for the network controller is synchronizing through the synchronization clock source, determining the synchronization time value for the synchronization clock source to send the pulse signal to the network controller and the interrupt controller of the system-on-chip.

18. A system-on-chip, comprising:

a transceiver interface, configured to receive a synchronization time value sent from a synchronization clock source;

a network controller, configured to receive and respond to a pulse signal sent from the synchronization clock source, and determine a first time value when receiving the pulse signal; and an interrupt controller, configured to receive and respond to the pulse signal sent from the synchronization clock source, and trigger an interrupt of a central processing unit, wherein the central processing unit is coupled to the network controller, the interrupt controller and the transceiver interface, and is configured to obtain the synchronization time value and the first time value; determine, in response to the interrupt of the central processing unit, a second time value of the network controller at an interrupt response moment, and a first system time value of the system-on-chip at the interrupt response moment; and perform time synchronization on the system-on-chip based on the synchronization time value, the first time value, the second time value, and the first system time value.

19. The system-on-chip according to claim 18, wherein the network controller comprises:

a timer, configured to receive and respond to the pulse signal, and send a first count value to a time register, wherein the time register is configured to store the first count value;

the central processing unit is coupled to the time register, and is configured to read the first count value, and determine the first time value based on the first count value; and the central processing unit is coupled to the timer, and is configured to read a second count value at the interrupt response moment, and determine the second time value based on the second count value.

20. A non-transient computer readable storage medium, wherein the storage medium stores a computer program, and the computer program is used for implementing a system-on-chip-based time synchronization method, wherein the system-on-chip-based time synchronization method comprises:

determining a synchronization time value for a synchronization clock source to send a pulse signal to a network controller and an interrupt controller of the system-on-chip, and a first time value when the interrupt controller and the network controller receive the pulse signal;

determining that the interrupt controller triggers an interrupt of a central processing unit of the system-on-chip in respond to the pulse signal;

determining a second time value of the network controller at an interrupt response moment, and a first system time value of the system-on-chip at the interrupt response moment; and performing time synchronization on the system-on-chip based on the synchronization time value, the first time value, the second time value, and the first system time value.

* * * * *